United States Patent
Liu et al.

(10) Patent No.: US 11,307,805 B2
(45) Date of Patent: Apr. 19, 2022

(54) DISK DRIVE CONTROLLER INCORPORATING TASK MANAGER FOR REDUCING PERFORMANCE SPIKES

(71) Applicant: Seagate Technology LLC, Fremont, CA (US)

(72) Inventors: Xiong Liu, Singapore (SG); Jin Quan Shen, Singapore (SG)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 16/887,257

(22) Filed: May 29, 2020

(65) Prior Publication Data

US 2021/0373808 A1    Dec. 2, 2021

(51) Int. Cl.
*G06F 13/00* (2006.01)
*G06F 3/06* (2006.01)
*G06F 9/50* (2006.01)
*G06F 9/48* (2006.01)

(52) U.S. Cl.
CPC .......... *G06F 3/0659* (2013.01); *G06F 3/0604* (2013.01); *G06F 3/0658* (2013.01); *G06F 3/0688* (2013.01); *G06F 9/4881* (2013.01); *G06F 9/505* (2013.01)

(58) Field of Classification Search
CPC ...... G06F 3/0659; G06F 3/0688; G06F 9/505; G06F 3/0658; G06F 9/4881; G06F 3/0604
See application file for complete search history.

(56) References Cited

U.S. PATENT DOCUMENTS

| | | |
|---|---|---|
| 5,537,566 A | 7/1996 | Konno et al. |
| 6,170,042 B1 | 1/2001 | Gaertner et al. |
| 6,834,386 B1 * | 12/2004 | Douceur ............... G06F 9/4881 718/102 |
| 6,938,256 B2 | 8/2005 | Deng et al. |
| 7,003,644 B2 | 2/2006 | Heath et al. |
| 7,734,837 B2 | 6/2010 | Hendel et al. |
| 8,898,385 B2 | 11/2014 | Jayaraman et al. |

(Continued)

OTHER PUBLICATIONS

Steere et al., "A Feedback-driven Proportion Allocator for Real-Rate Scheduling", Third Symposium on Operating Systems Design and Implementation (OSDI '99 ), USENIX Association, Feb. 22, 1999, pp. 145-158.

*Primary Examiner* — Jing-Yih Shyu
(74) *Attorney, Agent, or Firm* — Mueting Raasch Group

(57) ABSTRACT

A disk drive comprises non-volatile rotatable media and a controller operatively coupled to the non-volatile rotatable media. The controller is configured to receive a series of host commands to be executed by the controller and generate a command execution sequence comprising the series of host commands. A task manager, integral or coupled to the controller, is configured to receive a plurality of background tasks comprising a least two priority background tasks to be executed by the controller along with execution of the series of host commands, and insert one or more of the at least two priority background tasks into the command execution sequence while maintaining a specified ratio of priority background task execution and host command execution substantially constant. The controller is configured to execute the command execution sequence with the one or more inserted priority background tasks.

22 Claims, 9 Drawing Sheets

(56) References Cited

U.S. PATENT DOCUMENTS

| | | |
|---|---|---|
| 8,918,595 B2 | 12/2014 | Ebsen |
| 10,108,450 B2* | 10/2018 | Pinto ..................... G06F 3/0652 |
| 10,185,592 B2 | 1/2019 | Karaje et al. |
| 10,545,791 B2 | 1/2020 | Yerfule et al. |
| 2010/0030791 A1* | 2/2010 | Iverson ............... G06F 16/1737 |
| | | 713/320 |
| 2011/0288847 A1 | 11/2011 | Narayanan et al. |
| 2016/0092272 A1* | 3/2016 | Karaje .................... G06F 3/061 |
| | | 718/104 |
| 2017/0024243 A1* | 1/2017 | Kishan ...................... G06F 9/46 |
| 2017/0109101 A1* | 4/2017 | Hanson ................ G06F 3/0659 |
| 2020/0004674 A1 | 1/2020 | Williams |

* cited by examiner

DISK DRIVE CONTROLLER INCORPORATING TASK MANAGER FOR REDUCING PERFORMANCE SPIKES

SUMMARY

Embodiments are directed to a method comprising receiving, by a controller of a disk drive, a series of host commands to be executed by the controller. The method comprises generating, by the controller, a command execution sequence comprising the series of host commands. The method also comprises receiving, by a task manager of the controller, a plurality of background tasks comprising a least two priority background tasks to be executed by the controller along with execution of the series of host commands. The method further comprises inserting, by the task manager, one or more of the at least two priority background tasks into the command execution sequence while maintaining a specified ratio of priority background task execution and host command execution substantially constant. The method also comprises executing, by the controller, the command execution sequence with the one or more inserted priority background tasks.

Embodiments are directed to an apparatus comprising a disk drive comprising non-volatile rotatable media and configured to communicate with a host system. The disk drive comprises a controller operatively coupled to the non-volatile rotatable media. The controller is configured to receive a series of host commands to be executed by the controller and generate a command execution sequence comprising the series of host commands. A task manager, integral or coupled to the controller, is configured to receive a plurality of background tasks comprising a least two priority background tasks to be executed by the controller along with execution of the series of host commands, and insert one or more of the at least two priority background tasks into the command execution sequence while maintaining a specified ratio of priority background task execution and host command execution substantially constant. The controller is configured to execute the command execution sequence with the one or more inserted priority background tasks.

Embodiments are directed to an apparatus comprising a data storage system configured to communicate with a host system. The data storage system comprises at least one disk drive comprising non-volatile rotatable media and a controller operatively coupled to the disk drive. The controller is configured to receive commands from the host system including read/write commands and to execute background tasks including priority background tasks. The background tasks define operations performed by the controller distinct from controller operations responsive to the commands received from the host system. A task manager, integral or coupled to the controller, is configured to limit the number of priority background tasks executed by the controller in terms of estimated completion time within a time interval during which the controller is actively executing read/write commands received from the host system, and maintain a specified ratio of priority background task execution and read/write command execution substantially constant.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
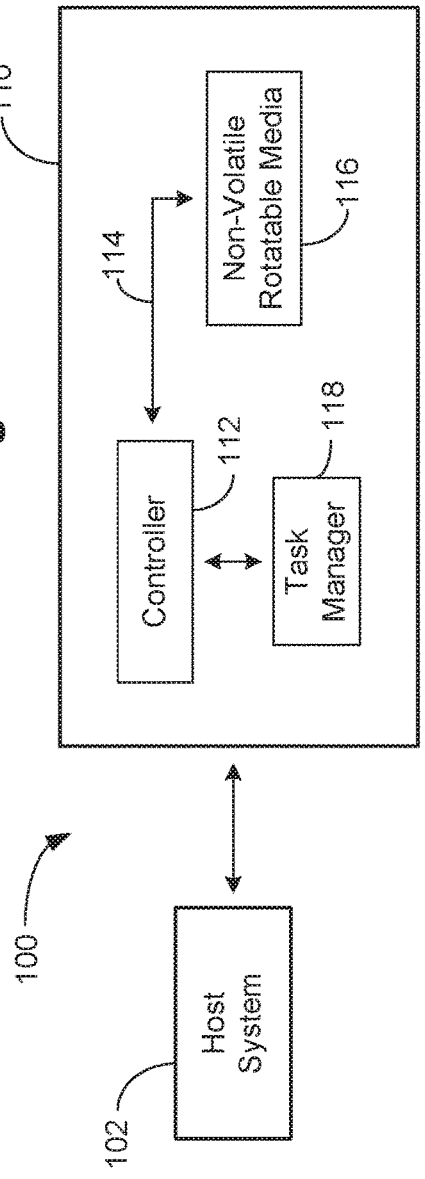
FIG. 1 is a block diagram of data storage apparatus configured to reduce or minimize disk drive performance spikes in accordance with embodiments described herein.

Disk drive systems and devices incorporate non-volatile rotatable media to store data. A controller of a disk drive system or device is configured to write data to, and retrieve data from, non-volatile rotatable media. In addition to read/write operations, the controller is configured to execute a wide variety of background tasks, including maintenance, data integrity checks, error recovery, and logging tasks, for example. In general terms, background tasks can be categorized as non-priority background tasks (NPBTs) and priority background tasks (PBTs). A non-priority background task is typically a low priority task that can be performed during idle time or when media access activity is relatively low. In contrast, a priority background task is typically a high priority task that needs to be executed concurrently with media access activity (e.g., writing and reading data to and from non-volatile rotatable media). Examples of non-priority and priority background tasks are provided hereinbelow.

In some scenarios, the controller concurrently receives two or more PBTs that require execution along with commands received from a host system, such as read/write commands. As can be appreciated, executing multiple PBTs while at the same time executing multiple host commands can result in performance spikes and a concomitant reduction in disk drive performance from the point of view of the host system. Some PBTs require a significant amount of time to complete which, if executed by the controller concurrently with host commands, can cause a performance spike and a concomitant reduction in disk drive performance from the point of view of the host system.

Efforts to increase track density (TPI measured, e.g., in tracks per inch) and satisfy high performance requirements have led manufacturers of hard disk drives (HDDs) to add more firmware features to HDDs in order to increase areal density capability (ADC measured, e.g., in gigabits per square inch or GBPSI), improve performance, and reduce power consumption. With the addition of more firmware features, the controller of an HDD is required to process an increasing number of background tasks and perform more frequent actions in addition to processing host commands (e.g., read/write commands). Processing of an increasing number of background tasks by the controller during execution of host commands can result in significant degradation in HDD performance from the point of view of the host system, particularly in the form of a performance spike.

Near-line (NL) storage is a type of storage medium that is external to a computer and provides quick and scalable access to storage devices/capacity within an IT environment. Near-line storage refers to any storage architecture, infrastructure or technology that resides between online and offline storage sources. In the case of near-line HDDs, IOPS (input/output operations per second) is an important parameter. However, the consistency of IOPS is more important than the sheer number of IOPS. Consequently, avoiding a performance spike for near-line HDDs and other types of HDDs is very important.

A key contributor to HDD performance spikes as viewed by the host system is the requirement for an HDD to perform priority background tasks concurrently, especially two or more priority background tasks with long complete times, while at the same time executing host commands (e.g., read/write commands). In conventional HDDs, host read/write commands and background tasks are managed separately. Host read/write commands have the highest priority. However, when priority background tasks require execution, the HDD has to execute these priority background tasks along with host read/write commands in order to maintain HDD data integrity and reliability, which can then induce a deleterious performance spike from the point of view of the host system. Embodiments of the disclosure are directed to apparatuses and methods for managing concurrent execution of host commands and priority background tasks by a controller of a disk drive system or device to reduce or minimize disk drive performance spikes experienced by the host system.

Figure 2:
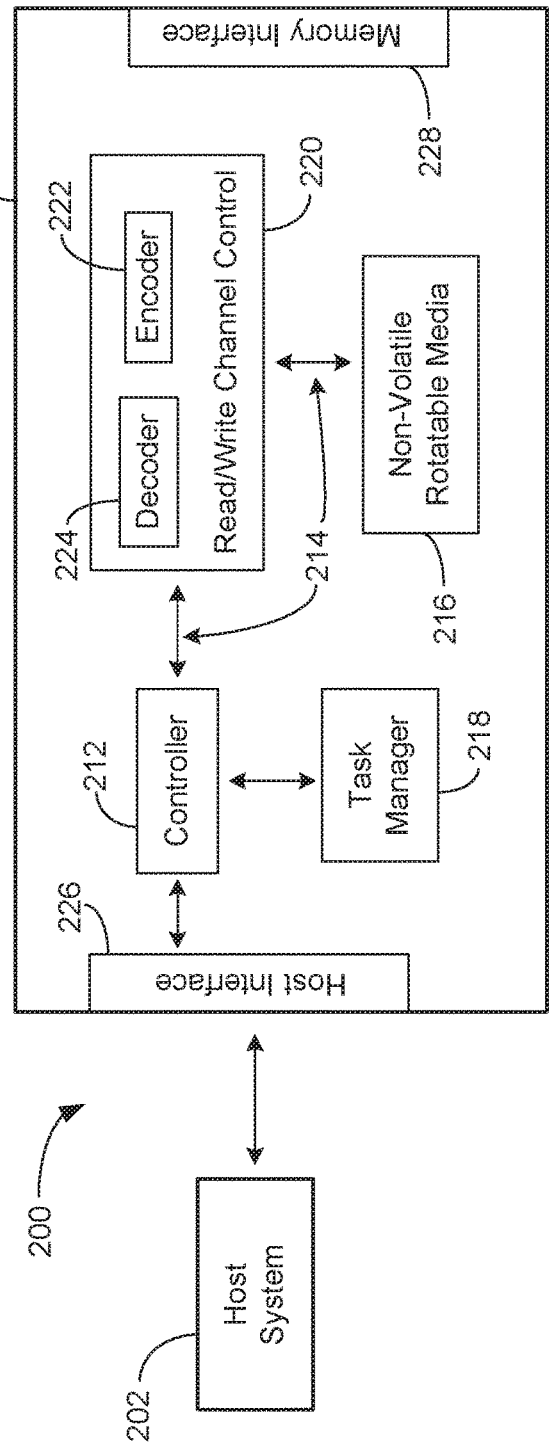
FIG. 2 is a block diagram of data storage apparatus configured to reduce or minimize disk drive performance spikes in accordance with embodiments described herein.

FIGS. 1 and 2 are block diagrams of data storage apparatuses configured to reduce or minimize disk drive performance spikes in accordance with embodiments described herein. The data storage apparatus 100 shown in FIG. 1 represents a generic data storage apparatus of the present disclosure, while data storage apparatus 200 shown in FIG. 2 is a particularized representation of a data storage apparatus of the present disclosure. The data storage apparatus 100, 200 includes a disk drive 110, 210 configured to communicate with a host system 102, 202. The disk drive 110, 210 includes a controller 112, 212 operatively coupled to the host system 102, 202 and non-volatile rotatable media 116, 216. The controller 112, 212 is coupled to non-volatile rotatable media 116, 216 via one or more channels 114, 214. A channel is a set of address lines and data lines that selects and accesses a specified portion of a memory device. The controller 112, 212 incorporates or is coupled to a task manager 118, 218, details of which are provided hereinbelow.

Non-volatile rotatable media 116, 216 can be representative of one or more magnetic disks (e.g., a single disk, multiple disks, one or more arrays of disks such as in the case of a RAID system). The data storage apparatus 100, 200 can correspond to a system or device which incorporates rotatable magnetic memory or to a hybrid memory system or device comprising a combination of rotatable magnetic memory and solid-state memory (e.g., SSDs, FLASH, FPGAs, etc.). The host system 102, 202 can be any type of computing system. The controller 112, 212 provides an interface between non-volatile rotatable media 116, 216 and the host system 102, 202. Responsive to host commands received from the host system 102, 202, the controller 112, 212 performs write and read operations to store data on, and access data from, non-volatile rotatable media 116, 216.

With specific reference to FIG. 2, in addition to the controller 212, the disk drive 210 includes a host interface 226, one or more channels 214, and a read/write channel control unit 220. In addition to the task manager 218, it is understood that the controller 212 can incorporate one or more of the host interface 226, channels 214 and read/write channel control unit 220. The host interface 226 is configured to facilitate the transfer of data between the controller 212 and the host system 202. The controller 212 is configured to receive memory access requests (e.g., read commands, write commands) from the host system 202 via the host interface 226. The controller 212 can also include a memory interface 228 that allows the controller 212 to access non-volatile rotatable media 216 to service memory access requests via the one or more channels 214.

The controller 212 includes or is coupled to the read/write channel control unit 220. In some implementations, the read/write channel control unit 220 includes an encoder unit 222 and/or a decoder unit 224. The encoder unit 222 may encode any data to be stored on non-volatile rotatable media 216 using an error correcting code (ECC). This encoded data can then be stored on non-volatile rotatable media 216 during a write operation via the memory device interface 228 and the one or more channels 214. During a read operation, the encoded data is read from the non-volatile rotatable media 216 and is decoded using the decoder unit 224. The encoded data is decoded using the ECC and transferred to the host system 202 via the host interface 226. The encoder unit 222 and decoder unit 224 use the ECC to attempt to correct errors that are present in the data read from non-volatile rotatable media 216. The data errors may arise, for example, due to noise during the read and/or write operations and/or due to data corruption.

Figure 3:
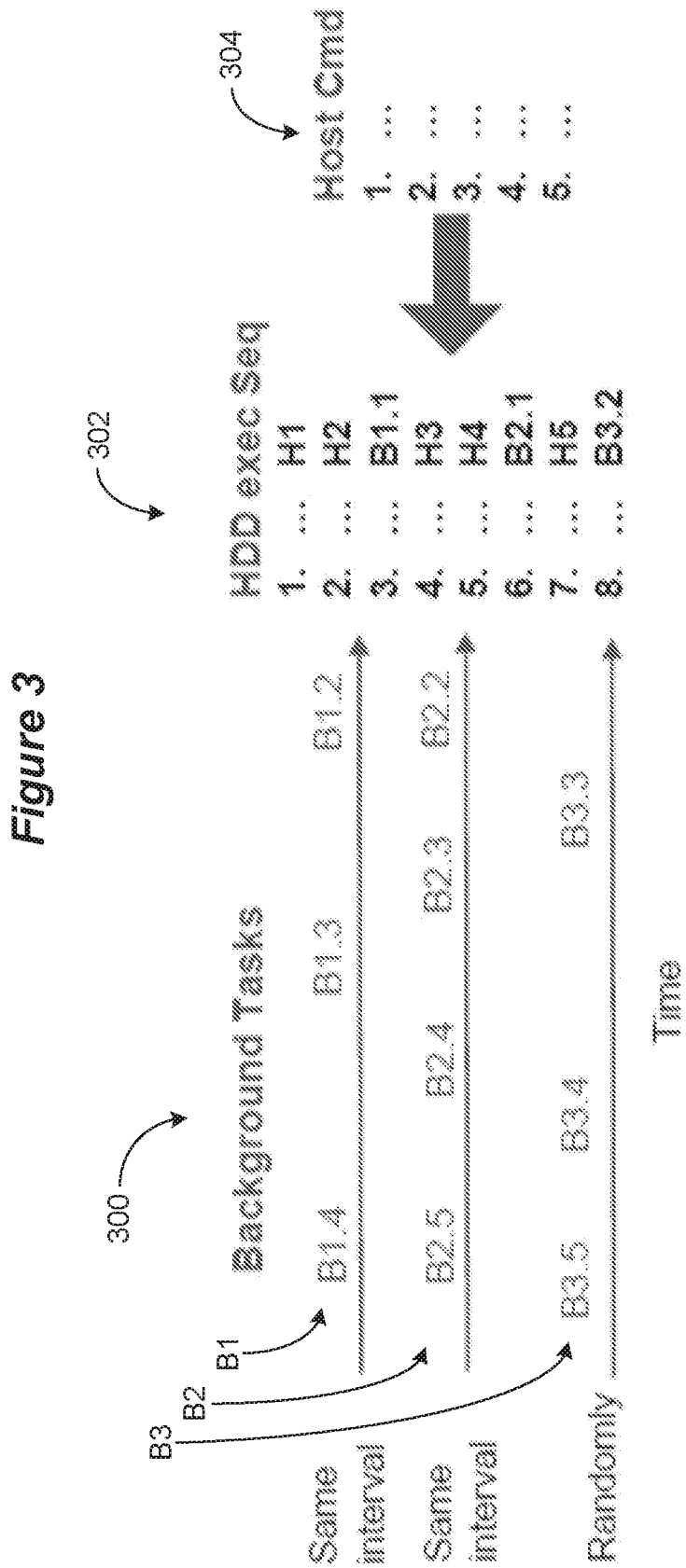
FIG. 3 illustrates a conventional approach to processing priority background tasks concurrently with host commands by a controller of a conventional disk drive.

In contrast to read/write commands originating in the host system 202, background tasks do not originate in the host system 202. Instead, background tasks originate in the controller 112, 212. FIG. 3 illustrates a conventional approach to processing background tasks 300 concurrently with host commands 304 by a conventional controller of a disk drive. As was previously discussed, host read/write commands and background tasks are managed separately in conventional HDDs. In the illustrative example shown in FIG. 3, five host commands 304, such as five read/write commands, are received by an HDD controller which require execution. The controller receives a number of priority background tasks 300 to be executed concurrently with execution of the host commands 304.

The representative priority background tasks 300 include a plurality of PBT sequences B1, B2, and B3. These PBT sequences differ in terms of intervals (e.g., time separation between adjacent PBTs) and command completion times (CCTs). The intervals between adjacent PBTs are dependent on a number of factors, including the duration of the CCTs of the PBTs in a given sequence. Other factors include the frequency at which a given PBT needs to be executed (which can be independent of its CCT) and the relative importance or priority of the PBT. Command completion times for different PBTs can vary significantly. As such, the intervals between adjacent PBTs and timing of arrival at the controller vary accordingly.

The PBT sequences B1 and B2 comprise PBTs having the same interval (e.g., fixed time separation) between adjacent PBTs. As shown, the intervals of PBT sequences B1 and B2 are different. More particularly, the intervals of PBT sequence B1 are longer than the intervals of PBT sequence B2. The intervals of PBT sequence B3 are random, in that the intervals between adjacent PBTs of PBT sequence B3 are not fixed but vary in a random or quasi-random manner. For example, some PBTs have an interval that depends on HDD workload and operating environment (e.g., temperature, humidity, vibration, etc.). As such, the intervals of such PBTs can appear to be random in duration.

As further shown in FIG. 3, a conventional controller generates a command execution sequence 302 which includes the five host commands 304 and three PBTs (B1.1, B2.1, B3.2) that arrived at the controller substantially at the same time as the host commands 304. According to a conventional processing approach, the conventional controller generates a command execution sequence 302 which includes PBTs B1.1, B2.1, B3.2 and commands H1, H2, H3, H4, H5 which correspond to the five host commands 304. Because host read/write commands and priority background tasks are managed separately in a conventional HDD, concurrent processing of the host commands 304 and priority background tasks 300 illustrated in FIG. 3 results in a performance spike and a concomitant reduction in HDD operating efficiency in terms of the HDD's response to the host commands 304.

Figure 4A:
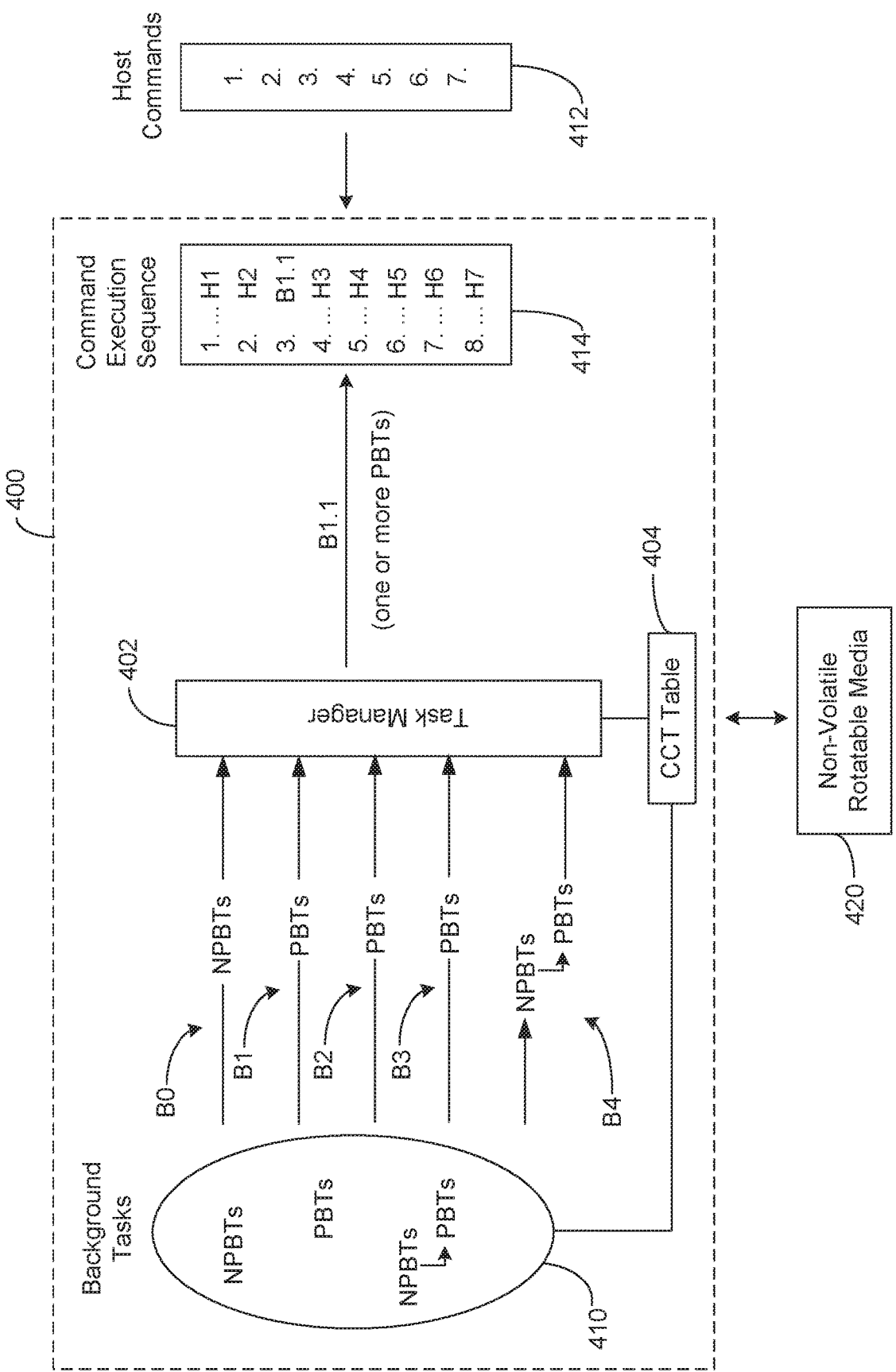
FIGS. 4A and 4B illustrate a controller of a data storage apparatus configured to manage concurrent execution of host commands and priority background tasks to reduce or minimize disk drive performance spikes in accordance with various embodiments.
Figure 4B:
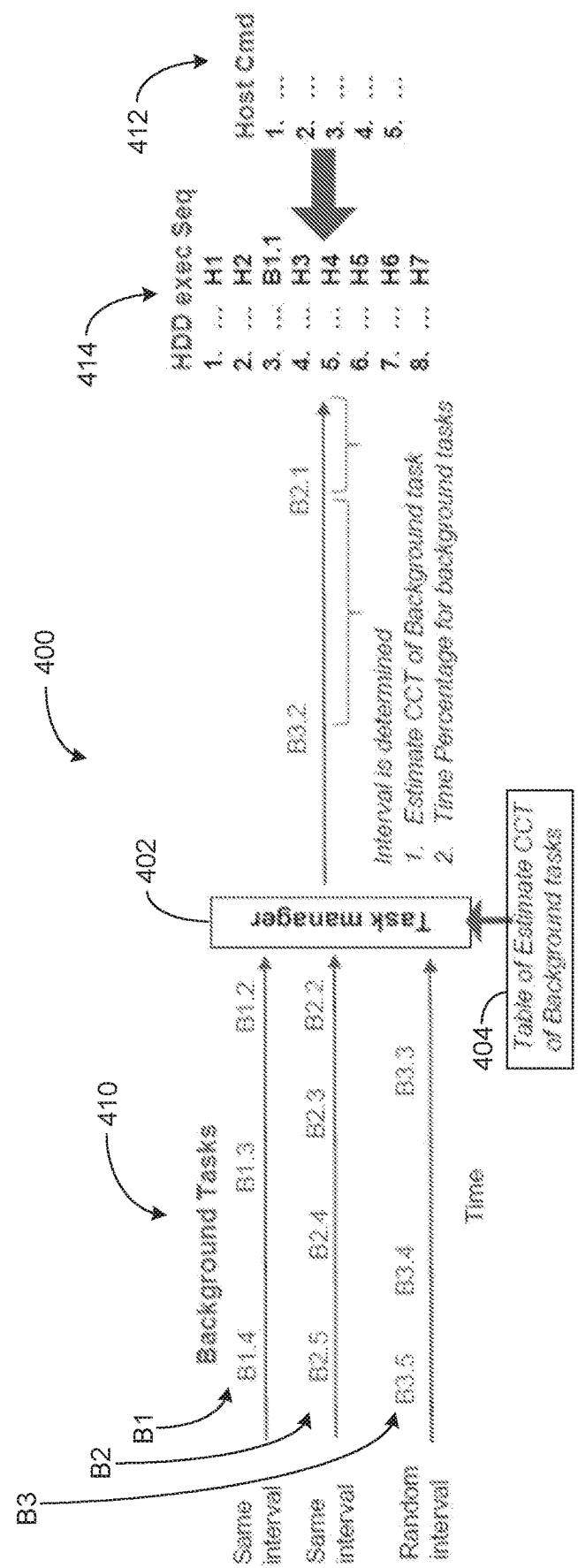

FIGS. 4A and 4B illustrates an HDD controller 400 configured to manage concurrent execution of host commands and priority background tasks to reduce or minimize disk drive performance spikes in accordance with various embodiments. The controller 400 can be any type of HDD controller including, but not limited to, a SATA (Serial ATA, e.g., eSATA, SATA RAID), PATA (Parallel Advanced Technology Attachment (ATA)), SCSI (Small Computer System Interface, e.g., Serial Attached SCSI or SAS) and hybrid HDD/SDD (Solid-State Drive) controller.

The controller 400 shown in FIGS. 4A and 4B includes a task manager 402 which incorporates or is coupled to a CCT table 404. The task manager 402 is configured to manage background tasks 410 to be executed by the controller 400. The background tasks 410 can include different types of background tasks including, but not limited to, priority background tasks or PBTs, non-priority background tasks or NPBTs, and non-priority background tasks that convert or transform to priority background tasks (NPBTs 4 PBTs). The CCT table 404 is configured to store estimated command completion times (estimated CCTs) for at least the PBTs to be executed by the controller 400.

For purposes of illustration, and not of limitation, the following text provides examples of various types of background tasks that can be processed by the controller 400. Priority background tasks can include, but are not limited to, Update DST (Drive Self-Test) log, Background Media Scan, TCC (temperature compensation control), SDS (Servo Disc Slip calibration), Sweep Seek, and DOS (Directed Offline Scan). Representative DOS tasks include DOS Check and DOS Repair. DOS Check refers to checking whether the track condition is good or not when the DOS count reaches a target number, such as 256. DOS Repair refers to a scenario in which the track condition is bad and needs to be repaired. Other examples of priority background tasks include error recovery and cache clearing tasks. For example, priority background tasks can include various data scrubbing tasks which can involve periodic inspection of non-volatile rotatable media for errors and subsequent corrections of detected errors using redundant data in the form of different checksums or copies of data.

Non-priority background tasks or NPBTs can include, but are not limited to, Device Statistics Logging, Save UDS (Unified Debug System) Data-to-Disc, Data Integrity Check, and Enhance Workload Management. In general, NPBTs are executed during HDD idle time. However, some NPBTs can become PBTs when they fulfill certain conditions. For example, media cache clearing is considered by the controller 400 as an NPBT if only 10% of media cache is used. However, media cache clearing can convert or transform from an NPBT to a PBT if 90% of media cache is used.

As is shown in FIG. 4A, the controller 400 is operatively coupled to non-volatile rotatable media 420 as previously discussed. The controller 400 is configured to receive a series of host commands 412 to be executed by the controller 400 and generate a command execution sequence 414 comprising the series of host commands 412. The task manager 402 is configured to receive a plurality of background tasks 410 to be executed at the appropriate time by the controller 400. As previously discussed, NPBTs can be executed by the controller 400 during idle times. During normal HDD operation, the task manager 402 receives PBTs (e.g., PBTs from PBT sequences B0 B1, B2, B3, B4 shown in FIG. 4A) that require execution concurrently with host commands 412. For example, the task manager 402 can receive two or more PBTs at substantially the same time to be executed by the controller 400 along with execution of the series of post commands 412.

In response to receiving two or more PBTs that require execution along with execution of the series of host commands 412, the controller 400 is configured to limit the number of PBTs to be executed during a timeframe in which a series of host commands 412 are to be executed by the controller 400 in a manner which reduces or minimizes an HDD performance spike from the point of view of the host system. For example, the task manager 402 of the controller 400 can be configured to limit the number of PBTs to be executed by the controller 400 in terms of the estimated command completion time (estimated CCT) during a period of time in which the host system continues to execute read/write activities. The task manager 402 obtains the estimated CCTs for the PBTs to be executed by the controller 400 via the CCT table 404.

The following text provides representative, non-limiting examples of CCTs for different PBTs that can be processed by the task manager 402 of the controller 400. A DOS Check PBT typically has a CCT=2×8.33 ms (for 7200 RPM drives). A DOS Repair PBT typically has a CCT=4×8.33 ms (for 7200 RPM drives). A TCC PBT typically has a CCT=3 ms with an interval=3 minutes. An SDS PBT typically has a CCT=0.5 s with an interval=5 minutes and 15 s. A Sweep Seek PBT typically has a CCT=10 ms with an interval=1 minute. It is understood that there are many different types of PBTs, and the task manager 402 can receive PBTs from the same or different PBT sequences. For example, the task manager 402 can receive two DOS PBTs at the same time if there are 2 tracks which reach the DOS count at the same time (e.g., when writing track n, it is possible for track n−1 and track n+1 to reach the DOS count at the same time). As such, there can be many PBTs in queue, but some or all of these can originate from the same PBT type. (e.g., a DOS PBT).

According to various embodiments, the task manager 402 is configured to insert one or more of the received PBTs (e.g., PBT B1.1 of PBT sequence B1) into the command execution sequence 414 while maintaining a specified ratio of priority background task execution and host command execution substantially constant. The controller 400 is configured to execute the command execution sequence 414 with the one or more inserted PBTs (e.g., PBT B1.1). By maintaining the specified ratio of priority background task execution and host command execution substantially constant, the controller 400 is advantageously able to reduce, minimize or prevent HDD performance spikes from the point of view of the host system.

As is shown in FIGS. 4A and 4B, the task manager 402 is configured to receive a plurality of PBT sequences B0, B1, B2, B3, B4 each comprising a plurality of PBTs (noting that only PBT sequences B1, B2, B3 are shown in FIG. 4B). The PBTs of each PBT sequence can have an interval (fixed or random) that differs from PBT intervals of other PBT sequences. In the representative scenario shown in FIGS. 4A and 4B, the task manager 402 receives at least two priority background tasks (e.g., B1.1 and B2.1 at substantially the same time followed by B3.2) that require execution concurrently with host commands 412. These two PBTs arrive at the task manager 402 at substantially the same time and originate from different PBT (e.g., B1 and B2) sequences having different PBT intervals.

The task manager 402 is configured to insert one or both of these two PBTs based on the estimated CCT of each PBT and the process time percentage for completing each PBT. The task manager 402 keeps the ratio of priority background task execution and host command execution substantially constant by avoiding execution of two or more time-consuming PBTs in the command execution sequence 414 (e.g., executing both PBTs B1.1 and B2.1 at substantially the same time) so as to reduce or minimize an HDD performance spike from the point of view of the host system. Instead of executing both PBTs B1.1 and B2.1 within the same command execution sequence 414 using a conventional approach (which would lead to a performance spike), the task manager 402 inserts PBT B1.1 in the command execution sequence 414 to maintain the specified ratio of priority background task execution and host command execution substantially constant. The task manager 402 can insert PBT B2.1 in a subsequent command execution sequence 414 for execution by the controller 400.

The specified ratio of priority background task execution (PBTE) and host command execution (HCE) maintained by the task manager 402 can be defined by the mathematical expression PBTE:HCE. In general, PBTE can range from about 1 to about 10, and HCE can range from about 90 to about 99. More particularly, PBTE can range from about 2.5 to about 7.5, and HCE can range from about 92.5 to about 97.5. It is been found that limiting PBTE to about 5% by the task manager 402 can minimize or eliminate processing spikes. By way of example, it can be assumed that the command execution sequence 414 has a duration of 10 seconds to complete. Using a PBTE:HCE ratio of 5:95 (5% versus 95%), the task manager 402 inserts one or more PBTs into the command execution sequence 414 to ensure that the specified PBTE:HCE ratio of 5:95 is substantially maintained over the course of the 10 second duration. As such, the controller 400 executes the command execution sequence 414 such that 5% of HDD process time (0.5 s) is allocated to executing the inserted PBT (or multiple PBTs) while 95% of HDD process time (9.5 s) is allocated to executing the host commands 412 of the command execution sequence 414.

As was previously discussed, PBTs can have a fixed interval or random interval, noting that most PBTs have a fixed interval. Some PBTs have long intervals, and as such, the number of long-interval PBTs generally do not dominate. Some PBTs have an interval (e.g., time separation or frequency) that depends on HDD workload and operating environment, which can make such PBTs appear to have random intervals. In situations where HDD workload is high, the task manager 402 is configured to assign more time to complete the PBT (or multiple PBTs) that are to be inserted into the command execution sequence 414, such as by increasing the time percentage for a given PBT. In this scenario, the HDD may have much less idle time which can be addressed by increasing the specified ratio of priority background task execution and host command execution (e.g., from 5:95 to 7.5:92.5) by the task manager 402.

In accordance with some embodiments, the task manager 402 can be configured to maintain the specified ratio of background task execution and host command execution substantially constant in terms of a parameter referred to equivalent Time (eT). Equivalent Time (eT) can be set, for example, equal to one hundredth of an average host read/write command complete time (CCT). The percentage of background tasks, including PBTs, to be processed by the controller 400 can be predetermined in terms of time, for example 5%. The number of eT units for each PBT to be processed by the controller 400 can be pre-calculated and stored in the CCT table 404. The stored eT unit for a particular PBT (or multiple PBTs) to be processed by the controller 400 can be transferred from the CCT table 404 to the task manager 402 when needed, such as when processing ScheduleServoDiscSlip and ScheduleSweepSeek PBTs for example. It is noted that the eT for some PBTs (e.g., ScheduleSmartSummaryFrameSave, ScheduleWorkloadTraceSaveToDisc) may need to be estimated on-line due to the variable data size of such PBTs.

Using the eT data stored in the CCT table 404, the task manager 402 keeps the specified ratio of background task execution and host command execution (e.g., PBTE:HCE ratio of 5:95) nearly constant in terms of eT. For example, and assuming a PBTE:HCE ratio of 5:95, if a particular PBT needs 200 eT units to complete, 38 host commands (3800 eT) will be added in the command execution sequence 414 after insertion of the particular PBT.

In some embodiments, the task manager 402 is configured to adjust the specified ratio of priority background task execution and host command execution response to changes in priority background task workload. The task manager 402 can be configured to increase a percentage of PBTs inserted into the command execution sequence 414 in response to the priority background task workload exceeding a first threshold. For example, the task manager 402 can increase the PBT insertion percentage from 5% to 7.5% if more than 50 PBTs are queued in the task manager 402, so as to avoid a performance spike. The task manager 402 can be configured to decrease the percentage of PBTs inserted into the command execution sequence 414 in response to the priority background task workload falling below a second threshold. For example, the task manager 402 can decrease the PBT insertion percentage from 5% to 2.5% if less than 10 PBTs are queued in the task manager 402. It is noted that the first and second thresholds can be the same or different thresholds.

In some embodiments, the task manager 402 is configured to convert one or more of the PBTs to one or more proxy host commands. Converting a PBT to a proxy host command can advantageously reduce or minimize the CCT for one or more host commands 412. In such embodiments, the task manager 402 is configured to insert one or more of the proxy host command into the command execution sequence 414 while maintaining the specified ratio of priority background task execution and host command execution substantially constant. For example, the task manager 402 can convert a DOS Repair PBT to a read command and a write command. As a consequence of this conversion process, a PBT task becomes two host commands with short CCTs, which enables the task manager 402 to manage the specified ratio (PBTE:HCE) more accurate and more easily. Also, converting one or more PBTs to proxy host commands by the task manager 402 can accelerate the overall CCT by sorting the task seeking path for host commands in queue.

In some embodiments, the task manager 402 is configured to divide at least one relatively large time-consuming PBT into a plurality of relatively less time-consuming PBTs. In such embodiments, the task manager 402 is configured to insert one or more of the plurality of relatively less time-consuming PBTs into the command execution sequence 414 while maintaining the specified ratio of priority background task execution and host command execution substantially constant. For example, the task manager 402 can convert a ScheduleSweepSeek PBT operative across all zones of a magnetic recording surface to a plurality of a ScheduleSweepSeek PBTs operative across a corresponding plurality of individual (single) zones of the magnetic recording surface.

FIGS. 5-9 are flow charts describing methods for managing concurrent execution of host commands and priority background tasks by a controller of a disk drive system or device to reduce or minimize disk drive performance spikes in accordance with various embodiments. The methods shown in FIGS. 5-9 can be implemented by any of the apparatuses shown in FIGS. 1, 2, 4A, and 4B.

Figure 5:
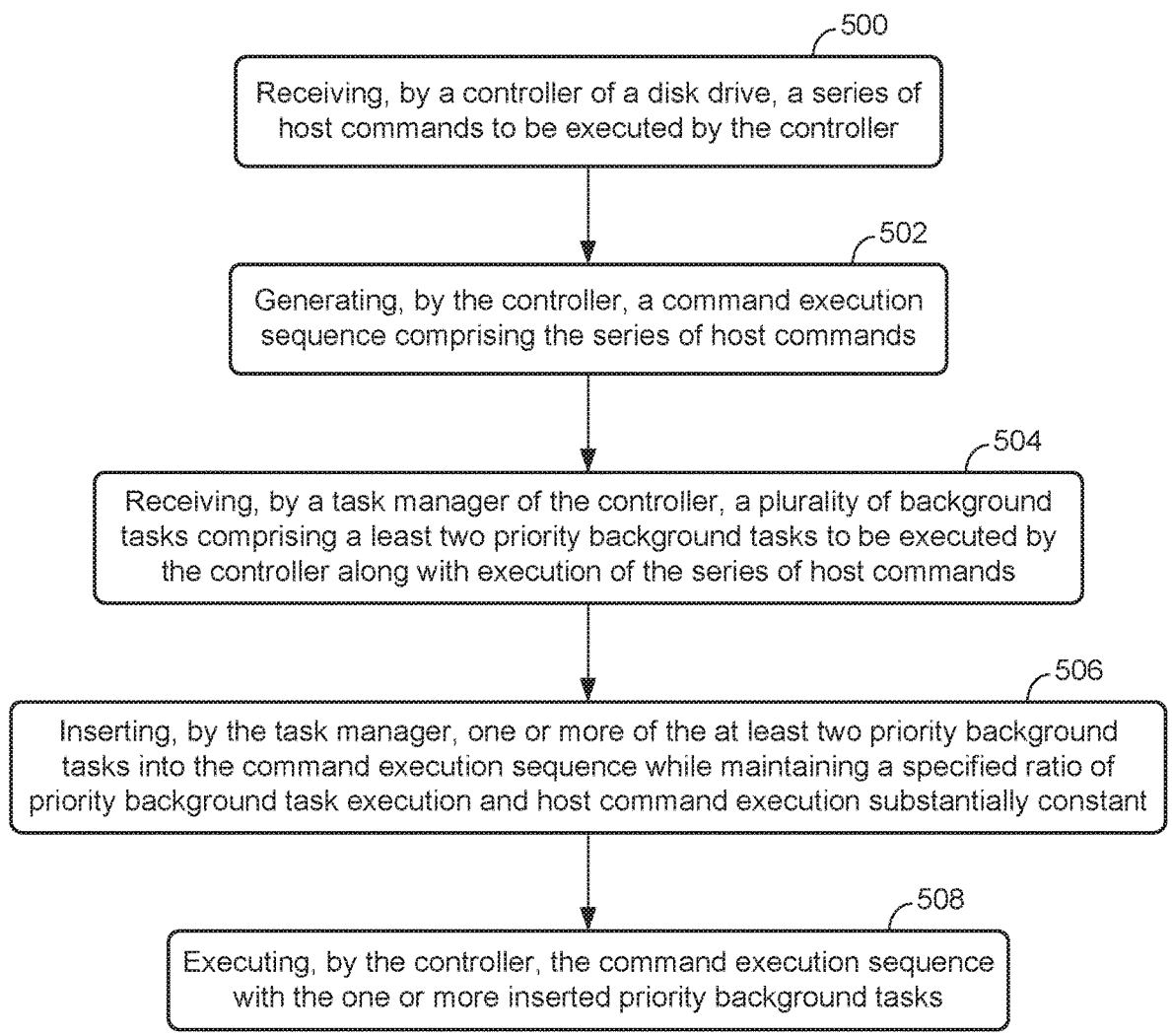
FIG. 5 is a flow chart describing a method for managing concurrent execution of host commands and priority background tasks by a controller of a disk drive system or device to reduce or minimize disk drive performance spikes in accordance with various embodiments.

The method shown in FIG. 5 involves receiving 500, by a controller of a disk drive, a series of host commands to be executed by the controller. The method involves generating 502, by the controller, a command execution sequence comprising the series of host commands. The method also involves receiving 504, by a task manager of the controller, a plurality of background tasks comprising at least 2 priority background tasks to be executed by the controller along with execution of the series of host commands. The method involves inserting 506, by the task manager, one or more of the at least 2 priority background tasks in the command execution sequence while maintaining a specified ratio of priority background task execution and host command execution substantially constant. The method also involves executing 508, by the controller, the command execution sequence with the one or more inserted priority background tasks.

Figure 6:
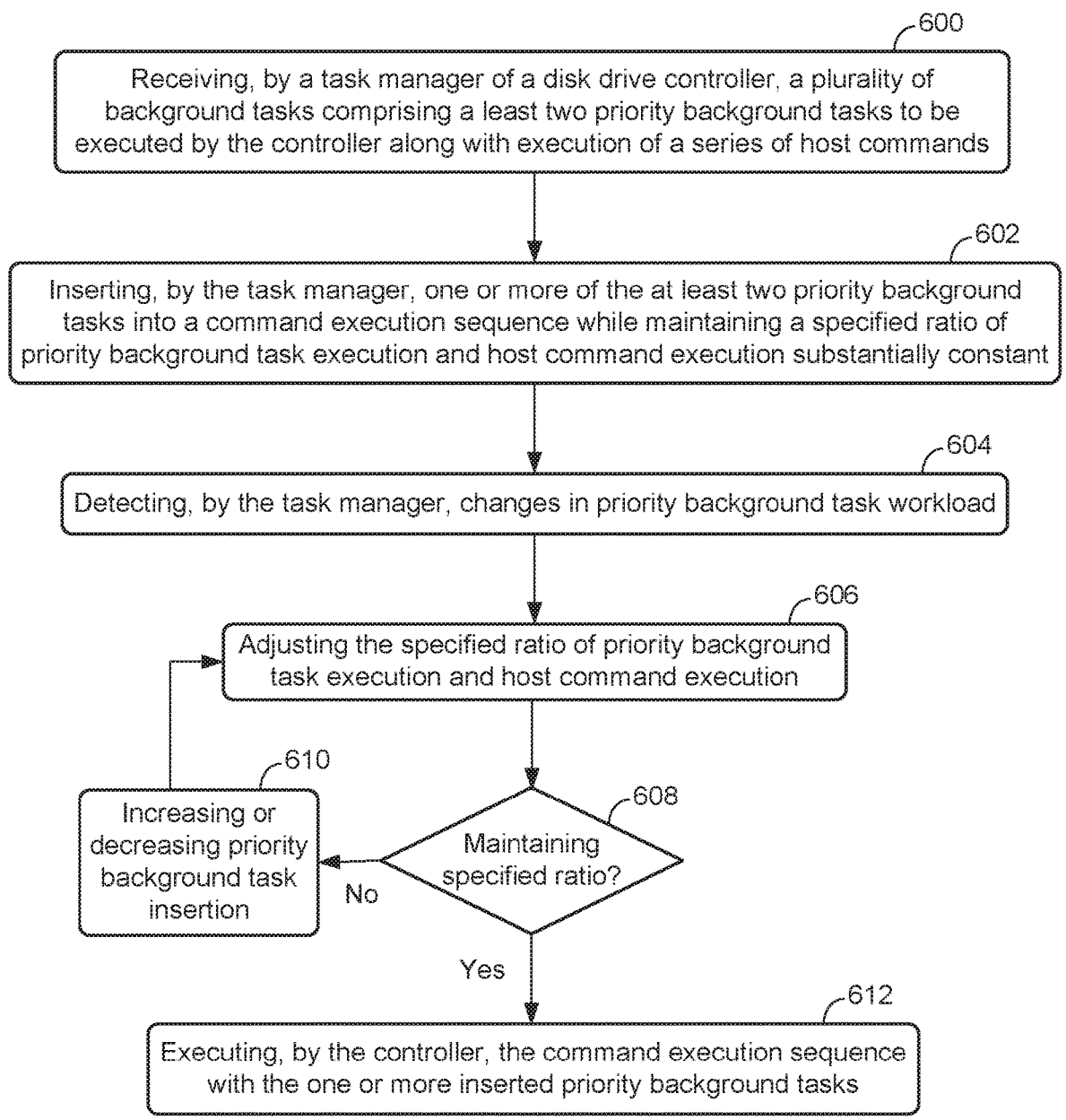
FIG. 6 is a flow chart describing a method for managing concurrent execution of host commands and priority background tasks by a controller of a disk drive system or device to reduce or minimize disk drive performance spikes in accordance with various embodiments.

The method shown in FIG. 6 involves receiving 600, by a task manager of a disk drive controller, a plurality of background tasks comprising at least 2 priority background tasks to be executed by the controller along with execution of a series of host commands. The method involves inserting 602, by the task manager, one or more of the at least 2 priority background tasks into a command execution sequence while maintaining a specified ratio of priority background task execution and host command execution substantially constant. The method also involves detecting 604, by the task manager, changes in priority background task workload. The method involves adjusting 606 the specified ratio of priority background task execution and host command execution in response to the changes in priority background task workload. A check 608 is made to determine if the specified ratio is substantially maintained by the task manager. If not, the method involves (a) increasing 610 priority background task insertion in response to an increase in priority background task workload and (b) decreasing 610 priority background task insertion in response to a decrease in priority background task workload in a manner previously described. If the specified ratio is maintained as tested at block 608, the method involves executing 612, by the controller, the command execution sequence with the one or more inserted priority background tasks.

Figure 7:
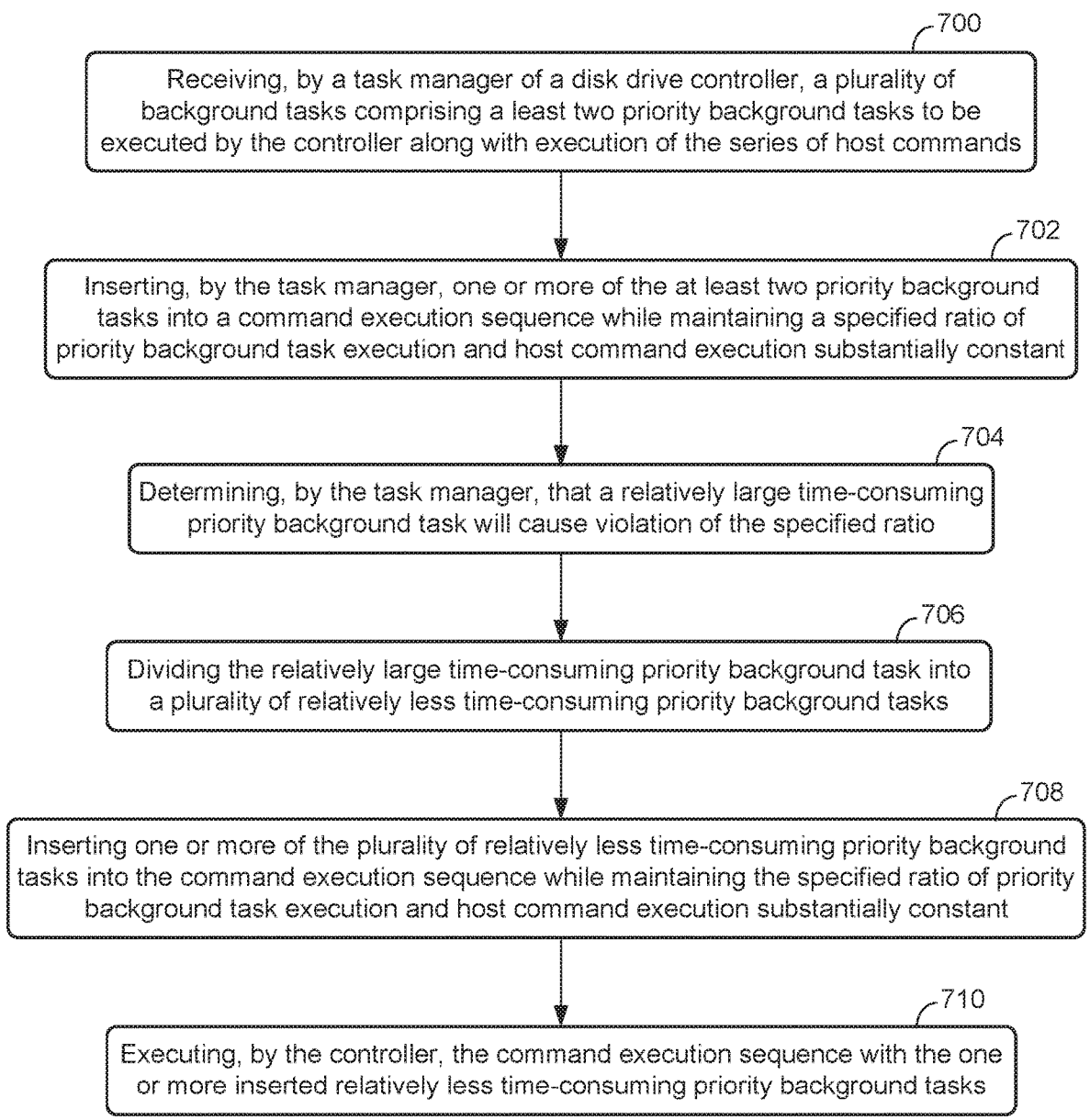
FIG. 7 is a flow chart describing a method for managing concurrent execution of host commands and priority background tasks by a controller of a disk drive system or device to reduce or minimize disk drive performance spikes in accordance with various embodiments.

The method shown in FIG. 7 involves receiving 700, by a task manager of a disk drive controller, a plurality of background tasks comprising a least two priority background tasks to be executed by the controller along with execution of the series of host command. The method involves inserting 702, by the task manager, one or more of the at least two priority background tasks into a command execution sequence while maintaining a specified ratio of priority background task execution and host command execution substantially constant. The method also involves determining 704, by the task manager, that a relatively large time-consuming priority background task will cause violation of the specified ratio. The method further involves dividing 706 the relatively large time-consuming priority background task into a plurality of relatively less time-consuming priority background tasks. The method involves inserting 708 one or more of the plurality of relatively less time-consuming priority background tasks into the command execution sequence while maintaining the specified ratio of priority background task execution and host command execution substantially constant. The method also involves executing 710, by the controller, the command execution sequence with the one or more inserted relatively less time-consuming priority background tasks.

Figure 8:
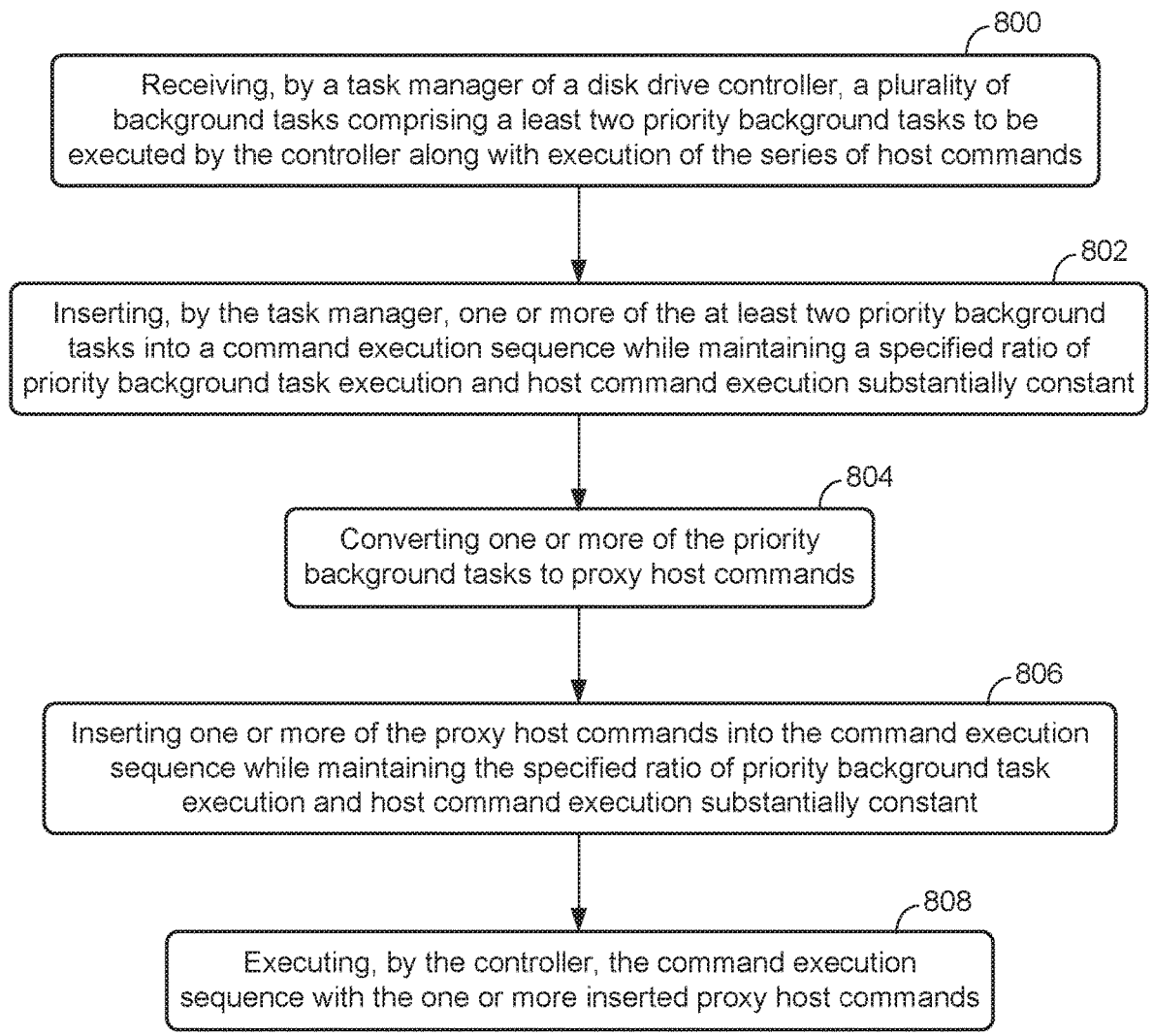
FIG. 8 is a flow chart describing a method for managing concurrent execution of host commands and priority background tasks by a controller of a disk drive system or device to reduce or minimize disk drive performance spikes in accordance with various embodiments.

The method shown in FIG. 8 involves receiving 800, by a task manager of a disk drive controller, a plurality of background tasks comprising a least two priority background tasks to be executed by the controller along with execution of the series of host commands. The method involves inserting 802, by the task manager, one or more of the at least two priority background tasks into a command execution sequence while maintaining a specified ratio of priority background task execution and host command execution substantially constant. The method also involves converting 804 one or more of the priority background tasks to proxy host commands. The method involves inserting 806 one or more of the proxy host commands into the command execution sequence while maintaining the specified ratio of priority background task execution and host command execution substantially constant. The method also involves executing 808, by the controller, the command execution sequence with the one or more inserted proxy host commands.

Figure 9:
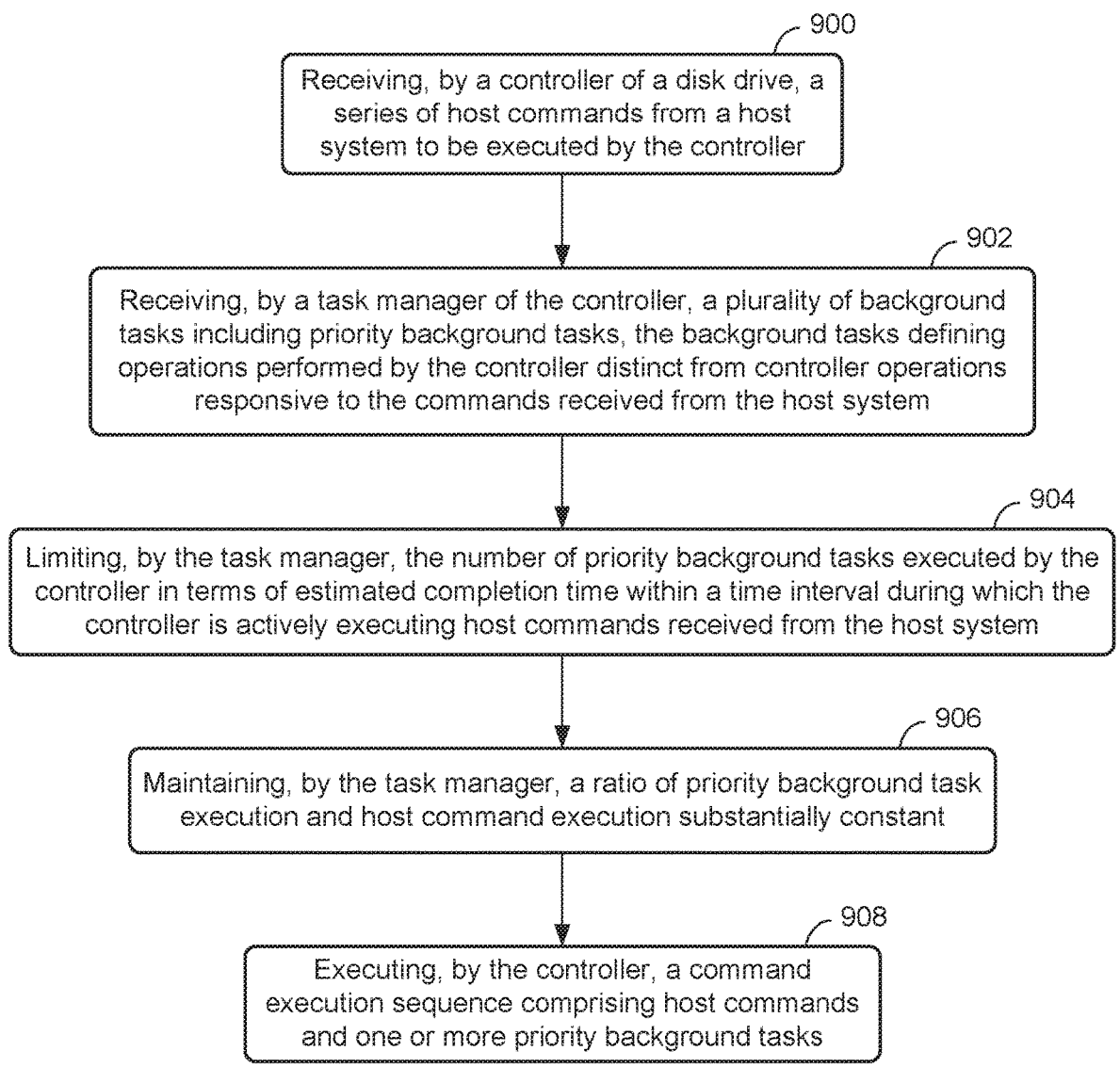
FIG. 9 is a flow chart describing a method for managing concurrent execution of host commands and priority background tasks by a controller of a disk drive system or device to reduce or minimize disk drive performance spikes in accordance with various embodiments.

The method shown in FIG. 9 involves receiving 900, by a controller of a disk drive, a series of host commands from a host system to be executed by the controller. The method involves receiving 902, by a task manager of the controller, a plurality of background tasks including priority background tasks, the background tasks defining operations performed by the controller distinct from controller operations responsive to the commands received from the host system. The method also involves limiting 904, by the task manager, the number of priority background tasks executed by the controller in terms of estimated completion time within a time interval during which the controller is actively executing host commands received from the host system. The method further involves maintaining 906, by the task manager, a ratio of priority background task execution and host command execution substantially constant. The method also involves executing 908, by the controller, a command execution sequence comprising host commands and one or more priority background tasks.

The controller 112, 212, 400 shown in FIGS. 1-2 and 4A-4B can include one or more processors or other logic devices. For example, the controller 112, 212, 400 can be representative of any combination of one or more logic devices (e.g., multi-core processor, digital signal processor (DSP), microprocessor, programmable controller, general-purpose processor, special-purpose processor, hardware controller, software controller, a combined hardware and software device) and/or other digital logic circuitry (e.g., ASICs, FPGAs), and software/firmware configured to implement the functionality disclosed herein. The controller 112, 212, 400 can incorporate or be coupled to various analog and digital components (e.g., ADCs, DACs, filters (e.g., FIR filter, Kalman filter), decoders, encoders, detectors, registers, I/O interfaces). The controller 112, 212, 400 can incorporate or be coupled to memory. The memory can include one or more types of memory, including ROM, RAM, SDRAM, NVRAM, EEPROM, and FLASH, for example.

Although many of the embodiments described above are directed to data storage devices which include rotatable media, it is understood that various embodiments of the disclosure can be implemented in the context of non-volatile solid-state data storage devices. For example, various embodiments of the disclosure can be implemented in solid-state drives (e.g., SAS and NVMe SSDs), storage class memory (SCM) drives (e.g., NVMe SCM), and other FLASH (e.g., NAND FLASH) based data storage drives and devices.

Although reference is made herein to the accompanying set of drawings that form part of this disclosure, one of at least ordinary skill in the art will appreciate that various adaptations and modifications of the embodiments described herein are within, or do not depart from, the scope of this disclosure. For example, aspects of the embodiments described herein may be combined in a variety of ways with each other. Therefore, it is to be understood that, within the scope of the appended claims, the claimed invention may be practiced other than as explicitly described herein.

All references and publications cited herein are expressly incorporated herein by reference in their entirety into this disclosure, except to the extent they may directly contradict this disclosure. Unless otherwise indicated, all numbers expressing feature sizes, amounts, and physical properties used in the specification and claims may be understood as being modified either by the term "exactly" or "about." Accordingly, unless indicated to the contrary, the numerical parameters set forth in the foregoing specification and attached claims are approximations that can vary depending upon the desired properties sought to be obtained by those skilled in the art utilizing the teachings disclosed herein or, for example, within typical ranges of experimental error.

The recitation of numerical ranges by endpoints includes all numbers subsumed within that range (e.g. 1 to 5 includes 1, 1.5, 2, 2.75, 3, 3.80, 4, and 5) and any range within that range. Herein, the terms "up to" or "no greater than" a number (e.g., up to 50) includes the number (e.g., 50), and the term "no less than" a number (e.g., no less than 5) includes the number (e.g., 5).

The terms "coupled" or "connected" refer to elements being attached to each other either directly (in direct contact with each other) or indirectly (having one or more elements between and attaching the two elements). Either term may be modified by "operatively" and "operably," which may be used interchangeably, to describe that the coupling or connection is configured to allow the components to interact to carry out at least some functionality (for example, a radio chip may be operably coupled to an antenna element to provide a radio frequency electric signal for wireless communication).

Terms related to orientation, such as "top," "bottom," "side," and "end," are used to describe relative positions of components and are not meant to limit the orientation of the embodiments contemplated. For example, an embodiment described as having a "top" and "bottom" also encompasses embodiments thereof rotated in various directions unless the content clearly dictates otherwise.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

As used herein, "have," "having," "include," "including," "comprise," "comprising" or the like are used in their open-ended sense, and generally mean "including, but not limited to." It will be understood that "consisting essentially of," "consisting of," and the like are subsumed in "comprising," and the like. The term "and/or" means one or all of the listed elements or a combination of at least two of the listed elements.

The phrases "at least one of," "comprises at least one of," and "one or more of" followed by a list refers to any one of the items in the list and any combination of two or more items in the list.

What is claimed is:

1. A method, comprising:
receiving, by a controller of a disk drive, a series of host commands to be executed by the controller;
generating, by the controller, a command execution sequence comprising the series of host commands;
receiving, by a task manager of the controller, a plurality of background tasks comprising at least two priority background tasks to be executed by the controller along with execution of the series of host commands;
inserting, by the task manager, one or more of the at least two priority background tasks into the command execution sequence while maintaining a specified ratio of priority background task execution and host command execution substantially constant;
executing, by the controller, the command execution sequence with the one or more inserted priority background tasks; and
adjusting, by the task manager, the specified ratio of priority background task execution and host command execution in response to changes in priority background task workload.

2. The method of claim 1, wherein:
the plurality of background tasks comprises non-priority background tasks and the priority background tasks;
the priority background tasks require execution by the controller along with the series of host commands; and
the non-priority background tasks do not require execution by the controller along with the series of host commands.

3. The method of claim 1, wherein:
receiving the at least two priority background tasks by the task manager comprises receiving a plurality of background task sequences each comprising a plurality of the priority background tasks; and
the at least two priority background tasks comprise at least one priority background task from one of the plurality of background task sequences and at least one priority background task from a different one of the plurality of background task sequences.

4. The method of claim 1, wherein each of the priority background tasks has an interval that differs from intervals of other priority background tasks.

5. The method of claim 1, wherein:
the specified ratio of priority background task execution (PBTE) and host command execution (HCE) is defined by a mathematical expression PBTE:HCE;
PBTE ranges from about 1 to about 10; and
HCE ranges from about 90 to about 99.

6. The method of claim 1, wherein:
the specified ratio of priority background task execution (PETE) and host command execution (HCE) is defined by a mathematical expression PBTE:HCE;
PETE ranges from about 2.5 to about 7.5; and
HCE ranges from about 92.5 to about 97.5.

7. The method of claim 1, comprising:
increasing, by the task manager, a percentage of the priority background tasks inserted into the command execution sequence in response to the priority background task workload exceeding a first threshold; and
decreasing, by the task manager, the percentage of the priority background tasks inserted into the command execution sequence in response to the priority background task workload falling below a second threshold;
wherein the first and second thresholds can be the same or different thresholds.

8. The method of claim 1, comprising:
converting, by the task manager, one or more of the priority background tasks to proxy host commands; and
inserting one or more of the proxy host commands into the command execution sequence while maintaining the specified ratio of priority background task execution and host command execution substantially constant.

9. The method of claim 1, comprising:
dividing, by the task manager, at least one relatively large time-consuming priority background task into a plurality of relatively less time-consuming priority background tasks; and
inserting, by the task manager, two or more of the plurality of relatively less time-consuming priority background tasks into the command execution sequence while maintaining the specified ratio of priority background task execution and host command execution substantially constant.

10. An apparatus, comprising:
a disk drive comprising non-volatile rotatable media and configured to communicate with a host system, the disk drive comprising:
a controller operatively coupled to the non-volatile rotatable media, the controller configured to receive a series of host commands to be executed by the controller and generate a command execution sequence comprising the series of host commands; and
a task manager integral or coupled to the controller, the task manager configured to:
receive a plurality of background tasks comprising at least two priority background tasks to be executed by the controller along with execution of the series of host commands; and
insert one or more of the at least two priority background tasks into the command execution sequence while maintaining a specified ratio of priority background task execution and host command execution substantially constant;
wherein the controller is configured to execute the command execution sequence with the one or more inserted priority background tasks, and the task manager is configured to adjust the specified ratio of priority background task execution and host command execution in response to changes in priority background task workload.

11. The apparatus of claim 10, wherein:
the plurality of background tasks comprises non-priority background tasks and the priority background tasks;
the priority background tasks require execution by the controller along with the series of host commands; and
the non-priority background tasks do not require execution by the controller along with the series of host commands.

12. The apparatus of claim 10, wherein:
the task manager is configured to receive a plurality of background task sequences each comprising a plurality of the priority background tasks; and
the at least two priority background tasks comprise at least one priority background task from one of the plurality of background task sequences and at least one priority background task from a different one of the plurality of background task sequences.

13. The apparatus of claim 10, wherein each of the priority background tasks has an interval that differs from intervals of other priority background tasks.

14. The apparatus of claim 10, wherein:
the specified ratio of priority background task execution (PBTE) and host command execution (HCE) is defined by a mathematical expression PBTE:HCE;
PBTE ranges from about 1 to about 10; and
HCE ranges from about 90 to about 99.

15. The apparatus of claim 10, wherein:
the specified ratio of priority background task execution (PBTE) and host command execution (HCE) is defined by a mathematical expression PBTE:HCE;
PBTE ranges from about 2.5 to about 7.5; and
HCE ranges from about 92.5 to about 97.5.

16. The apparatus of claim 10, wherein the task manager is configured to:
increase a percentage of the priority background tasks inserted into the command execution sequence in response to the priority background task workload exceeding a first threshold; and
decrease the percentage of the priority background tasks inserted into the command execution sequence in response to the priority background task workload falling below a second threshold;
wherein the first and second thresholds can be the same or different thresholds.

17. The apparatus of claim 10, wherein the task manager is configured to:
convert one or more of the priority background tasks to one or more proxy host commands; and
insert one or more of the proxy host commands into the command execution sequence while maintaining the specified ratio of priority background task execution and host command execution substantially constant.

18. The apparatus of claim 10, wherein the task manager is configured to:
divide at least one relatively large time-consuming priority background task into a plurality of relatively less time-consuming priority background tasks; and
insert one or more of the plurality of relatively less time-consuming priority background tasks into the command execution sequence while maintaining the specified ratio of priority background task execution and host command execution substantially constant.

19. The apparatus of claim 10, wherein the disk drive is configured as a near-line (NL) disk drive.

20. An apparatus, comprising:
a data storage system configured to communicate with a host system, the data storage system comprising:
at least one disk drive comprising non-volatile rotatable media;
a controller operatively coupled to the disk drive and configured to receive commands from the host system including read/write commands and to execute background tasks including priority background tasks, the background tasks defining operations performed by the controller distinct from controller operations responsive to the commands received from the host system; and
a task manager integral or coupled to the controller, the task manager configured to:
limit a number of priority background tasks executed by the controller in terms of estimated completion time within a time interval during which the controller is actively executing read/write commands received from the host system;
maintain a specified ratio of priority background task execution and read/write command execution substantially constant; and
adjust the specified ratio of priority background task execution and read/write command execution in response to changes in priority background task workload.

21. The apparatus of claim 20, wherein:
the specified ratio of priority background task execution (PBTE) and read/write command execution (RWCE) is defined by a mathematical expression PBTE:RWCE;
PETE ranges from about 1 to about 10; and
WRCE ranges from about 90 to about 99.

22. The apparatus of claim 20, wherein the at least one disk drive is configured as a near-line (NL) disk drive.

* * * * *

UNITED STATES PATENT AND TRADEMARK OFFICE
CERTIFICATE OF CORRECTION

PATENT NO. : 11,307,805 B2
APPLICATION NO. : 16/887257
DATED : April 19, 2022
INVENTOR(S) : Xiong Liu and Jin Quan Shen It is certified that error appears in the above-identified patent and that said Letters Patent is hereby corrected as shown below:

In the Claims

In Column 13, Claim 6 Line 53, '(PETE)' should be -- (PBTE) --.

In Column 13, Claim 6 Line 55, 'PETE' should be -- PBTE --.

In Column 16, Claim 21 Line 36, 'PETE' should be -- PBTE --.

In Column 16, Claim 21 Line 37, 'WRCE' should be -- RWCE --.

Signed and Sealed this
Eleventh Day of April, 2023

Katherine Kelly Vidal
*Director of the United States Patent and Trademark Office*